Figure 1:
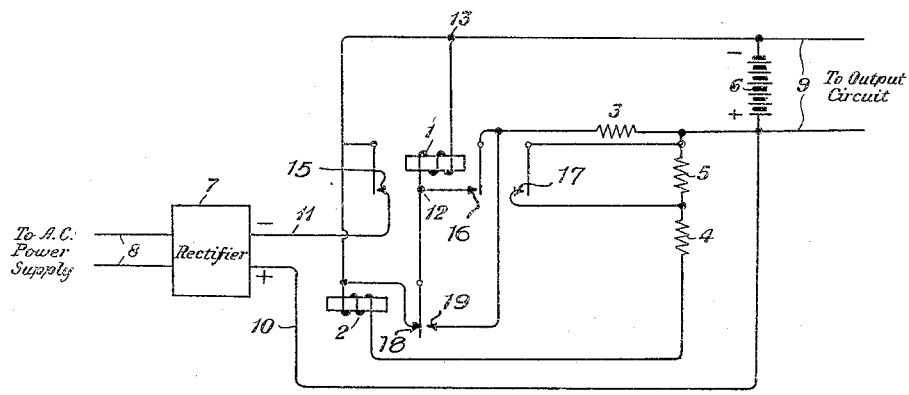

March 3, 1931.   W. D. FORSTER   1,794,400

AUTOMATIC CHARGE CONTROL UNIT FOR STORAGE BATTERIES

Filed Nov. 30, 1928

INVENTOR
W. D. Forster
BY
ATTORNEY

Patented Mar. 3, 1931

1,794,400

UNITED STATES PATENT OFFICE

WILLIAM D. FORSTER, OF GLENSIDE, PENNSYLVANIA

AUTOMATIC CHARGE-CONTROL UNIT FOR STORAGE BATTERIES

Application filed November 30, 1928. Serial No. 322,770.

This invention discloses novel control means for automatically regulating the amount of energy supplied to a storage battery from a charging source in such manner that the charge on the battery is maintained within predetermined voltage limits. The control unit described herein may be constructed at small cost, requires practically no attention after installation, and is characterized by its rugged and efficient operation.

Although a number of automatic charge control units of the type described are known to the art, none of them has proved entirely satisfactory in service. Practically all of the control units thus far disclosed are open to the objection that they are either expensive to build or uncertain in operation, or both. For example, an automatic control unit which utilizes the well-known voltmeter type of relay for regulating the connection of the charging source to the battery is both expensive in construction and delicate in operation, due to the fact that the circuit operation is dependent upon an extremely light floating contact of the voltmeter relay to accomplish the regulation. As a result of this feature, expensive circuit arrangements must be resorted to in order to avoid burning of the delicate relay contacts, and even where all possible precautions are thus taken, a considerable trouble is experienced where this type of relay is used.

As to the necessity for a satisfactory automatic charge control unit, little need be said as its growing importance, especially in the electrical communication field, is at once apparent. The value of such a unit in connection with the operation of private branch exchanges in the telephone industry might be pointed out, however.

As is well known, it is common practice in giving telephone service to many office buildings, hotels or apartment houses, to install in the building in question a miniature switchboard termed a private branch exchange, or simply a P. B. X. The P. B. X. serves to establish connections between telephones in the building or with an outside station. These P. B. X.'s, especially the larger ones, are commonly equipped with small storage batteries to furnish the necessary power to operate the telephone equipment.

In the past, it has been the common practice to charge these P. B. X. batteries with power supplied over leads extending from the central office, or where this method is not economical, by means of charging equipment located at the P. B. X. With either method, however, no automatic control device has been used. As a result, where local charging is resorted to, an attendant is required to operate the charging equipment, which is of course, expensive. Charging from the central office as commonly employed has the drawback that there is no way of accurately regulating the charge to just the desired value. Since there is no way of telling from the central office the condition of the battery at a given time, the charge supplied must be sufficiently great to offset the largest drain to which the battery will probably be subjected in service. As a result, the charge is set so high as to frequently overcharge the battery and thus cause "gassing."

"Gassing" of the battery results in many deleterious effects, as, for example, loss of liquid, loss of active material, forming sediment in the battery, and other injury to the plates. The result is that frequent visits must be made to the various P. B. X.'s by a repairman for the purpose of cleaning the batteries, adding water, and renewing the injured parts. Despite these precautions, however, it has been found in practice that this method of charging greatly shortens the life of the batteries below what it normally should be. It will thus be seen that it is very important to obtain some automatic means for regulating the charge upon the battery which will insure sufficient charge thereon but which will prevent overcharging with the resultant bad effects.

The present invention discloses an automatic control device which will maintain the charge on the battery between almost any desired voltage limits down to a practically negligible voltage variation. The invention is best disclosed by reference to the drawings, of which Figure 1 shows in diagrammatic form a circuit arrangement embodying the essential features of the invention, while Fig. 2 shows a slight modification over the circuit arrangement of Fig. 1.

Figure 2:
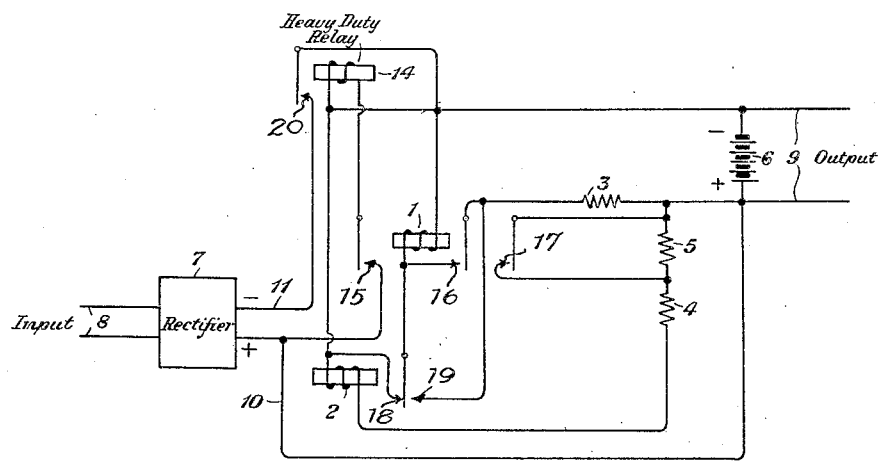

Referring to Fig. 1, the charge control unit comprises two relays numbered 1 and 2 and the three resistances 3, 4 and 5. Standard types of telephone relays have been used satisfactorily for relays 1 and 2. Since the energy taken by the control circuit is very small, both relays and resistance may be economically constructed.

The battery 6, to be charged, is connected to an output circuit over leads 9. The power supply for charging the battery is connected to leads 8. The circuit is adapted to utilize the regular house supply of electric power furnished by the electric light and power companies. It has been assumed in the circuit arrangement of Fig. 1 that this power supply will be alternating current, necessitating the interposition of a rectifier 7 between the source of power and the battery. Any suitable rectifier for charging the battery 6 could be utilized, but it is suggested that the recently developed copper oxide rectifier would be well adapted to this purpose, since it is cheap and requires no attention in operation. Of course, if the house supply of electrical power is direct current, or if direct current charging from the central office is resorted to, the rectifier 7 would be omitted and the series resistance inserted in leads 8 to limit the charging current to a suitable value.

Relay 2 of Fig. 1 controls the circuit and regulates the connection and disconnection of the charging source from the battery 6. Relay 2 is permanently connected between the terminals of battery 6 and operates the charge control unit in accordance with the battery voltage. It is a well-known fact that as a storage battery discharges, its terminal voltage drops, and conversely, during charge of the battery, its terminal voltage gradually rises again. Relay 2, operating in conjunction with resistances 4 and 5 in a manner to be explained, is adjusted to release and thus connect the charging circuit to the battery when the battery becomes discharged, to such an extent that its terminal voltage falls below a specified value, and to re-operate and disconnect the charging apparatus when the battery has been charged again to an extent that its terminal voltage exceeds a specified value, in general, somewhat higher than that first mentioned. In this way the terminal voltage of the battery is constantly and automatically maintained between certain specified voltage limits.

Relay 2 has the characteristic in common with all relays, that it releases on a much lower current than is required to operate the same, or stated in another way, it will release when the voltage across it falls below a certain value and re-operate again when this voltage exceeds a considerably higher value. Owing to this inherent relay characteristic, any relay in series with a suitable resistance connected between the battery terminals could be utilized as a rough automatic charge control unit for regulating the connection of a source of charging current to the battery; since, due to its inherent operating characteristics, it would release when the terminal voltage of the battery fell below a certain value and re-operate again when its voltage exceeded a considerably higher value.

In general, however, regulation by this simple expedient is not satisfactory, due to the fact that there is too great a range between the operate and release voltages of the relay. In the present invention, this difficulty is overcome by so arranging the circuit that as soon as the control unit functions to disconnect the charging circuit from the battery, an additional resistance is cut in series with relay 2 to reduce the current in its winding to a value slightly more than just sufficient to hold the relay operated. The result is that as soon as the battery voltage, due to discharge, has dropped by a very small amount, the current through relay 2 will fall below the release value, thus releasing the same and connecting the charging source to the battery.

The circuit is further so arranged that as soon as relay 2 releases in the manner explained, the additional resistance in series with the relay winding is short-circuited. The result is that the current through the relay winding immediately rises to a value slightly less than that necessary to operate the same; and consequently, when the terminal battery voltage, due to charging, has risen by a relatively small amount, relay 2 will re-operate to disconnect the charging source from the battery. This cycle of operations proceeds automatically and continuously to maintain the battery voltage between the specified voltage limits.

Referring again to Fig. 1, the exact manner in which the cycle of operations described above is carried out will now be traced in detail. With the circuit arranged as shown on the drawing, the charging circuit is disconnected from the battery. Under this condition, a circuit is traced from the negative terminal of battery 6, through the winding of relay 2, through resistances 4 and 5 in series and back to the positive terminal of battery 6. Resistances 4 and 5 in series so adjust the current through the winding of relay 2 that the relay will release at a predetermined battery voltage. When the battery voltage during discharge sinks to the value at which the charging should start, relay 2 releases, completing a circuit to operate relay 1. This circuit is traced from the negative terminal of battery 6, through the winding of relay 1, armature and back contact 19 of relay 2, and through resistance 3 to the positive terminal of battery 6. Resistance 3 adjusts the current flowing through the winding of relay 1 to a suitable value to insure operation of relay 1 by means of battery 6 without causing the flow of excessive current through the relay winding.

Relay 1, when operating over the circuit described, completes a holding circuit through its right inner front contact 16 and armature to resistance 3. This holding path, it will be noted, is in shunt with the operating path which was traced through the armature and back contact 19 of relay 2, thus preventing the further flow of current through the contacts of relay 2. This arrangement has the advantage that later, when relay 2 re-operates to disconnect the charging current, as will be explained below, the back contact 19 of relay 2, due to this shunt path, will be carrying no current and hence, no arcing will occur at the relay contacts. This prevents burning of the relay contacts which, in turn, might impair the relay adjustment.

The operation of relay 1 connects the rectifier 7, properly poled, across the terminals of battery 6 in order to start charging the battery. The circuit is traced from the positive terminal of the rectifier over lead 10 to the positive terminal of battery 6, through the battery to the negative terminal and back to the rectifier through the left armature and front contact 15 of relay 1, and over lead 11 to the negative rectifier terminal.

In addition to the above functions, relay 1, upon operating, short-circuits resistance 5 by means of the short-circuiting path through the right outer armature and front contact 17 of relay 1. The shunting out of resistance 5 in this manner leaves only resistance 4 in series with the winding of relay 2. Resistance 4 adjusts the current through the winding of relay 2 to such a value that relay 2 will re-operate when battery 6 has been charged to a predetermined potential which, in general, will be somewhat higher than that at which relay 2 released.

When the potential of battery 6 has risen during the charge to the proper value, relay 2 re-operates and short-circuits the winding of relay 1. The short-circuiting path is traced from terminal 12 of relay 1, through the armature and front contact 18 of relay 2, to the other terminal 13 of relay 1. Current previously supplied to the winding of relay 1 from battery 6 is now diverted from the relay winding by the short-circuit, causing the release of relay 1. This method of releasing relay 1 reduces arcing at the contacts of the holding path for relay 1 traced from terminal 12 through the right inner front contact 16 and armature of the relay, due to the fact that the inductive winding of the relay is no longer in circuit and only the current through the non-inductive resistance 3 is interrupted. It should be noted at this point that when relay 2 releases again at some subsequent time re-connect the charging circuit to the battery, current will have ceased to flow through its armature and front contact 18 so that no burning of these contacts will occur. Thus both the front and back contacts of relay 2 are protected against arcing.

Relay 1, on releasing, disconnects at its left front contact 15 the charging circuit from battery 6. The opening of the circuit through the right inner contact 16 and armature of relay 1 again places the operating circuit of this relay under control of relay 2 through the armature and back contact 19 thereof, as explained above. The release of the right outer armature of relay 1 opens the shunt path around resistance 5 and thus reconnects this resistance in series with the winding of relay 2. This immediately reduces the current through the winding of relay 2 to a value which will cause the relay to release when the voltage of battery 6 has fallen during discharge thereof to a certain predetermined value. The circuit is now restored to its initial condition, and hence, the cycle of operations has been completely traced.

If the charging current is too heavy to be carried by the contacts of relay 1, this relay may be made to operate a second heavy duty relay having contacts sufficiently rugged to carry the charging current without appreciable injury thereto. Fig. 2 shows a circuit arrangement for accomplishing this result. The circuit is identical with that of Fig. 1 except for the addition of the heavy duty relay 14, together with the necessary changes in wiring. In the circuit of Fig. 2, relay 2 releases, as before, to operate relay 1 when the voltage of battery 6 has fallen to the specified value. The operation of relay 1 completes an operating circuit for relay 14. This circuit is traced from plus battery, over lead 10, through the left front contact 15 and armature of relay 1, and through the winding of relay 14, back to the negative side of battery 6. Relay 14 operates over this circuit and connects the negative lead 11 from rectifier 7 through the front contacts 20 and armature of relay 14 to the negative terminal of battery 6. This connects the charging circuit to the battery 6 since the positive terminal of the rectifier is permanently connected to that of the battery over lead 10. When relay 2 later re-operates at the proper battery voltage during charge thereof, relay 1 releases, in turn opening the circuit to release relay 14. The release of relay 14 disconnects the charging circuit from the battery 6, thus restoring the control circuit to its initial condition.

The close margin of operation of relay 2 is obtained by the use of resistance 5 alternately cut in and out of the circuit, operating in conjunction with resistance 4. Resistance 4 alone determines the battery voltage at which relay 2 will operate, while resistances 4 and 5 in series determine the voltage at which the relay releases. By properly selecting these resistances, the charge control circuit is capable of being adjusted to start and stop the charge at the same voltage. With such close regulation, however, the circuit operation becomes extremely sensitive and pulsing is apt to occur, i. e., the relays will continuously operate and release in succession. For this reason it is believed that it would be impracticable to have an operating margin of less than .5 volt, i. e., relay 2 should be adjusted to release at .5 volt lower than that at which it operates. This margin of operation, however, is well within practical limits since, in general, for an eight-cell battery, a two-volt range between the charge and discharge points is permissible. The magnitudes of resistances 3, 4 and 5 are, of course, dependent upon the resistances of the relays and also the number of cells in the battery 6.

Experimental sets were constructed using a pair of standard telephone relays for relays 1 and 2 on the drawing. These control units were found to give satisfactory results for a continuous testing period extending over about three months. It was found that the battery voltage could be satisfactorily maintained between the limits of 2.05 and 2.3 volts per cell, although it would be perfectly feasible to have a closer regulation than this, if found desirable. For an eight-cell battery the regulation mentioned would amount to a total voltage fluctuation not exceeding 2.0 volts. No gassing of batteries was observed during the testing period, and it was necessary to add water to the cells only once during that time. The experimental charge control unit was found to consume a negligible amount of power since only a few milliamperes were required for operating the relays.

It was found that the type of relay best adapted for use as relay 2 of the drawing was one equipped with an armature of appreciable mass placed opposite one end of the solenoid and approximately parallel thereto. The armature was, of course, pivoted to swing between front and back contacts and was normally maintained against the back contact by means of a fine helical tension spring having one end affixed to the frame of the relay structure. It was further found that best results were obtained with this relay placed in a horizontal position, that is, with the axis of the solenoid parallel to the ground and with the pivotal point of the armature toward the ground. It is probable, however, that various standard types of relays could be made to function satisfactorily as relay 2 of the drawing.

What is claimed is:

1. Automatic charging means comprising in combination, a storage battery, a source of power for charging the same, a primary relay connected across said battery, resistance included in said relay circuit whereby it releases at a predetermined voltage, a secondary relay under control of the primary relay for connecting said charging source to the battery and for short-circuiting said resistance whereby the primary relay operates at a predetermined voltage.

2. Automatic charging means comprising in combination, a storage battery, a source of power for charging the same, a primary relay connected across said battery, resistance included in said relay circuit whereby it releases at a predetermined voltage, a secondary relay under control of the primary relay for connecting said charging source to the battery and for short-circuiting said resistance whereby the primary relay operates at a predetermined voltage, the same or greater than that first mentioned.

3. Automatic charging means comprising in combination, a storage battery, a source of power for charging the same, a primary relay connected across said battery, resistance included in said relay circuit whereby it leases at a predetermined battery voltage, a secondary relay under control of the primary relay for connecting said power source to said battery and for short-circuiting said resistance whereby said primary relay operates at a predetermined battery voltage, said secondary relay upon operation completing a holding path in shunt with its operating path through contacts of said primary relay whereby current thereafter ceases to flow through said contacts.

4. Automatic charging means comprising in combination, a storage battery, a source of power for charging the same, a primary relay connected across said battery, resistance included in said relay circuit whereby it releases at a predetermined battery voltage, a secondary relay under control of the primary relay, being short-circuited with the primary operated and operated with the primary released, said secondary relay controlling a circuit to connect said charging source to the battery, and a circuit to short-circuit said resistance whereby the primary relay operates at a predetermined battery voltage.

5. Automatic charging means comprising in combination, a storage battery, a source of power for charging the same, a primary relay connected across said battery, resistance included in said relay circuit whereby it releases at a predetermined battery voltage, a secondary relay under control of the primary relay, being short-circuited with the primary operated and operated with the primary released, said secondary relay controlling a circuit to connect said charging source to the battery, and a cirucit to short-circuit said resistance whereby the primary relay operates at a predetermined battery voltage, and a circuit to complete a holding path for said secondary relay in shunt with its operating path through contacts of the primary relay whereby current thereafter ceases to flow through said contacts.

6. Means for automatically regulating the charge on a storage battery comprising a primary relay permanently connected across said battery, resistance included in series with the primary relay whereby it releases at a predetermined battery voltage, a secondary relay controlled by the primary relay being short-circuited with the primary relay operated and operable by said battery with said primary relay released, said secondary relay in its operated condition connecting a source of power to said battery for charging the same, short-circuiting a portion of said resistance in the primary relay circuit whereby the primary relay operates at a predetermined battery voltage, and completing a holding path for itself in shunt with its operating circuit through contacts on the primary relay whereby current ceases to flow through said contacts.

7. Means for automatically regulating the amount of charge on a storage battery comprising in combination, a first relay connected across said battery, resistance interposed in said relay circuit whereby it releases at a predetermined battery voltage, a second relay controlled by the first, said second relay controlling a circuit for short-circuiting a portion of said series resistance whereby the first relay operates at a predetermined battery voltage, a third relay under control of the second for connecting a source of power to said battery for charging the same.

8. Means for automatically regulating the amount of charge on a storage battery comprising a first relay connected across the battery, resistance in said relay circuit whereby it releases at a predetermined voltage, a second relay controlled by the first, said second relay being operable to short-circuit a portion of said resistance whereby the first relay operates at a predetermined voltage, and operable to complete a holding circuit for itself in shunt with its operating circuit through contacts of the first relay whereby current ceases to flow through said contacts, a third relay under control of the second for connecting a source of power to said battery to charge the same.

9. Automatic regulating means comprising in combination a storage battery, a source of power for charging the same, a primary relay, resistance included in the circuit of said relay whereby said relay releases at a predetermined voltage, and a secondary relay under the control of said primary relay for connecting said charging source to said battery and for disassociating said resistance from said primary relay circuit whereby said primary relay operates at a predetermined voltage.

In testimony whereof, I have signed my name to this specification this 22d day of November, 1928.

WILLIAM D. FORSTER.